US010216448B2

(12) United States Patent
Nakagawa et al.

(10) Patent No.: US 10,216,448 B2
(45) Date of Patent: Feb. 26, 2019

(54) STORAGE SYSTEM WITH READ REQUEST ACCELERATOR HAVING DYNAMIC INTERNAL DATA MEMORY ALLOCATION (71) Applicant: HITACHI, LTD., Tokyo (JP)

(72) Inventors: Kazushi Nakagawa, Tokyo (JP); Masanori Takada, Tokyo (JP); Norio Simozono, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 38 days.

(21) Appl. No.: 15/129,480

(22) PCT Filed: Sep. 11, 2014

(86) PCT No.: PCT/JP2014/074017
§ 371 (c)(1),
(2) Date: Sep. 27, 2016

(87) PCT Pub. No.: WO2016/038710
PCT Pub. Date: Mar. 17, 2016

(65) Prior Publication Data
US 2017/0177270 A1 Jun. 22, 2017

(51) Int. Cl.
G06F 13/00 (2006.01)
G06F 3/06 (2006.01)
(52) U.S. Cl.
CPC ............ G06F 3/0647 (2013.01); G06F 3/061 (2013.01); G06F 3/0604 (2013.01);
(Continued)
(58) Field of Classification Search
CPC .... G06F 3/0647; G06F 3/0685; G06F 3/0604; G06F 3/0611
(Continued)

(56) References Cited

U.S. PATENT DOCUMENTS 7,130,968 B2 * 10/2006 Taylor ................ G06F 12/0802
711/140
2004/0210584 A1 * 10/2004 Nir .......................... H04L 67/06
(Continued)

FOREIGN PATENT DOCUMENTS

JP 09-006704 A 1/1997
JP 2005-084907 A 3/2005
JP 2014-041646 A 3/2014

OTHER PUBLICATIONS

International Search Report of PCT/JP2014/074017 dated Nov. 25, 2014 and English Translation of Written Opinion.

Primary Examiner — Hong C Kim
(74) Attorney, Agent, or Firm — Mattingly & Malur, PC (57) ABSTRACT The storage system has one or more storage drives, and one or more controllers for receiving processing requests from a superior device, wherein each of the one or more controllers has a processor for executing the processing request and an accelerator, and the accelerator has multiple internal data memories and an internal control memory, wherein if the processing request is a read I/O request, it stores a control information regarding the request to the internal control memory, and reads data being the target of the relevant request from at least one storage drive out of the multiple storage drives, which is temporarily stored in the one or more said internal data memories, and transferred sequentially in order from the internal data memory already storing data to the superior device.

6 Claims, 8 Drawing Sheets (52) U.S. Cl.
CPC .......... *G06F 3/0611* (2013.01); *G06F 3/0658* (2013.01); *G06F 3/0685* (2013.01); *G06F 3/0688* (2013.01); *Y02D 10/14* (2018.01); *Y02D 10/151* (2018.01)

(58) Field of Classification Search
USPC .......... 711/118, 119, 165, 154; 710/107, 305
See application file for complete search history.

(56) References Cited

U.S. PATENT DOCUMENTS

| | | |
|---|---|---|
| 2005/0086425 A1 | 4/2005 | Okuno |
| 2011/0252274 A1 | 10/2011 | Kawaguchi et al. |
| 2012/0092040 A1* | 4/2012 | Xu .................... G06F 17/30675 326/39 |

\* cited by examiner

STORAGE SYSTEM WITH READ REQUEST ACCELERATOR HAVING DYNAMIC INTERNAL DATA MEMORY ALLOCATION

TECHNICAL FIELD

The present invention relates to a storage system for speedily processing read I/O requests from a host computer.

BACKGROUND ART

A storage system is equipped with storage media (HDDs (Hard Disk Drives), SSDs (Solid State Drives) and the like), and a controller for receiving I/O (Input/Output) requests (hereinafter denoted as "I/O requests") from a host computer and the like. The controller is composed of a CPU, a memory, a storage I/F and a disk I/F, for example, as taught in Patent Literature 1. In the case of a read I/O request, an I/O control program operating in the CPU stores the data read from the storage media via the disk I/F in a cache data area created in the memory. Next, the I/O control program returns the data from the cache data area via the storage I/F to the host computer.

CITATION LIST

Patent Literature

[PTL 1] Japanese Patent Application Laid-Open Publication No. 2014-041646

SUMMARY OF INVENTION

Technical Problem

As described above, when a read I/O request is received from a host computer or the like, the CPU of the controller allocates a cache data area in the memory, and temporarily stores all the data read from the storage media in the cache data area. Next, the CPU performs a procedure to read the data from the cache data area and transfer the same to the host computer.

According to this method, there is a drawback that in the attempt to improve the controller performance, the memory bandwidth may become a bottleneck. Further, a memory having a large capacity is required as the cache data area.

Therefore, a method is considered to expand the bandwidth and the capacity by increasing the number of memories installed in the controller, but in that case, significant increase of bandwidth cannot be realized easily since there is an upper limit in the number of memory channels of a CPU, and it may lead to increased costs. Further, the power consumption and the installation area required by the memories are increased, so that the mounting of controllers becomes difficult.

Solution to Problem

The storage system according to the present invention has one or more storage drives, and one or more controllers for receiving processing requests from a superior device, wherein each of said one or more controllers has a processor for executing the processing request from the superior device and an accelerator, the accelerator having multiple internal data memories and an internal control memory, wherein if the processing request is a read I/O request, it stores a control information regarding the request in the internal control memory, and data being the target of the relevant request is read from at least one storage drive out of the multiple storage drives, which is temporarily stored in the one or more said internal data memories, and transferred sequentially in order from the internal data memory already storing data to the superior device.

Advantageous Effects of Invention

According to the storage system of the present invention, improvement of performance is realized by increasing the speed of the read I/O request, and installation can also be facilitated without increasing costs.

DESCRIPTION OF EMBODIMENTS

Now, the preferred embodiments 1 through 3 of the present invention will be described with reference to the drawings.

<Embodiment 1>

Figure 1:
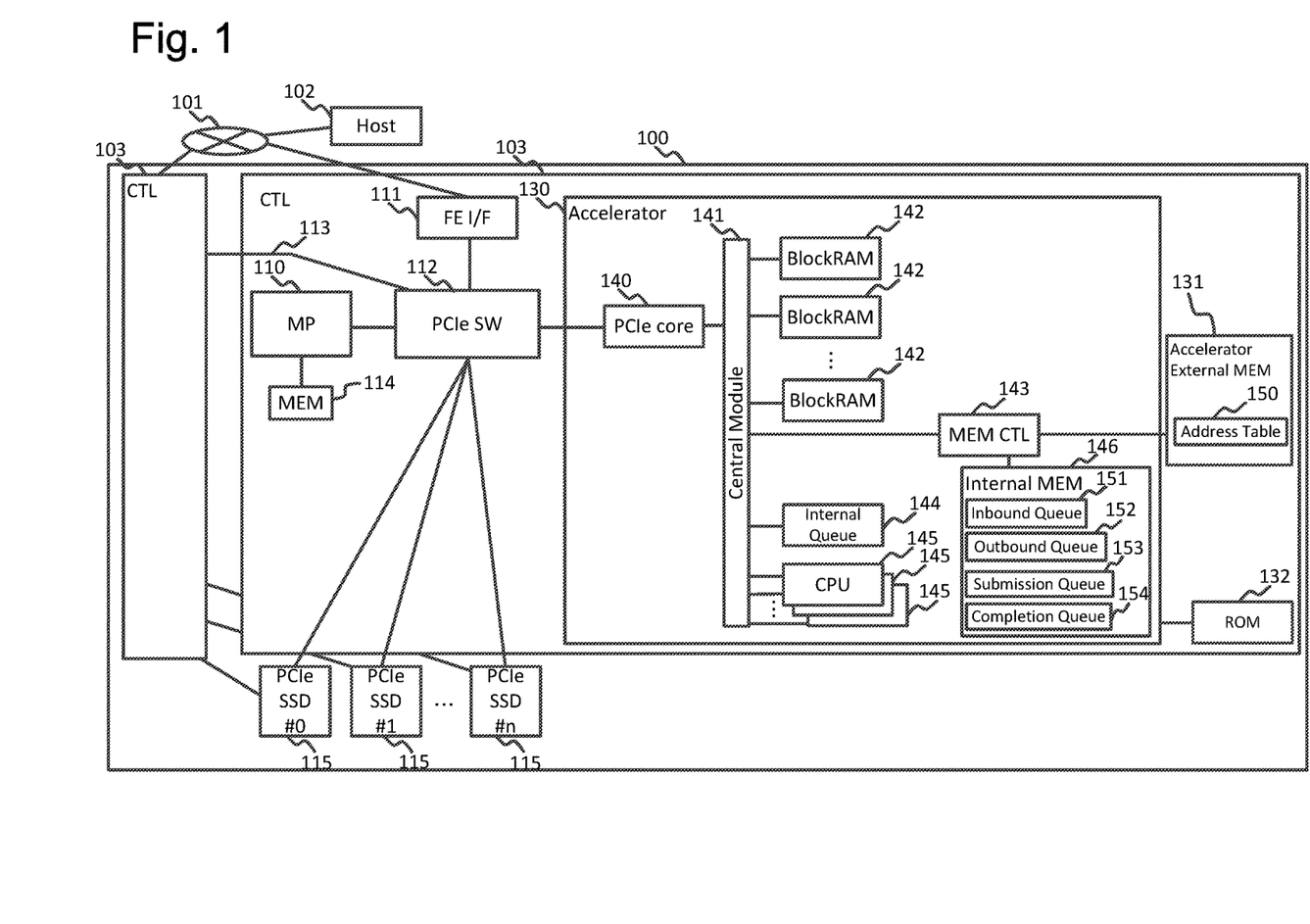
FIG. 1 is a configuration diagram of a computer system according to Embodiment 1 of the present invention.

FIG. 1 is a configuration diagram of a computer system according to Embodiment 1, which is a first preferred embodiment of the present invention.

The computer system is composed of a storage system 100, a host computer 102, and a network 101 connecting the same.

The network 101 should be a network capable of realizing communication, such as a SAN (Storage Area Network), an InfiniBand (Registered Trademark), a Serial Rapid IO, a PCI Express (Registered Trademark), a LAN (Local Area Network), a WAN (Wide Area Network), the Internet or a wireless network, and it is not specified. The protocol in the network 101 can adopt various protocols, such as a Fibre Channel protocol or a TCP/IP, and it is also not specified.

The host computer 102 transmits an I/O request (read I/O request or write I/O request) and a control request (such as initialization) to the storage system 100 via the network 101. In the case of a read I/O request (including a LUN (Logical Unit Number), an LBA (Logical Block Address), length and so on of the read target), a read data is returned from the storage system 100. Further, in the case of a write I/O request (including a LUN or an LBA of the write target, and a write data or the like), a write complete response is returned from the storage system 100.

The storage system 100 has multiple SSDs 115, and multiple controllers 103 receiving I/O requests from the host computer 102 and accessing any one of the SSDs 115. In the present example, there are multiple SSDs as storage drives and multiple controllers, but it is also possible to construct a storage system by providing only one SSD and one controller as the minimum configuration.

The SSD 115 is a medium having multiple flash memory chips installed, for example, and capable of storing data in a nonvolatile manner. The SSD 115 can be substituted by other nonvolatile storage media, such as an HDD, a phase change memory and so on. A PCI Express protocol is adopted as the interface protocol of the SSDs 115, and it can be a PCI Express-based NVM Express, for example. Further, the SSDs 115 are shared by multiple controllers 103.

The controllers 103 adopt a redundant configuration, and when failure occurs to one controller, another controller can take over and continuously perform the I/O processing in succession. The controllers 103 constitute a RAID (Redundant Array of Independent Disks) using multiple SSDs 115. Further, the controllers 103 realize capacity virtualization via Thin Provisioning technique, data compression/deduplication processing, and backup to remote sites. A connection line connecting the controllers 103 is used to exchange I/O requests and data.

The controller 103 is composed of a MicroProcessor (hereinafter denoted as "MP") 110, a PCI Express Switch (hereinafter denoted as "PCIe SW") 112, a memory for MP 114, a FrontEnd interface (hereinafter referred to as "FE I/F") 111, an accelerator 130, an external memory for accelerator 131, and a ROM (Read Only Memory) 132.

The MP 110, the accelerator 130, the FE I/F 111 and the SSDs 115 are mutually connected via the PCIe SW 112 by PCI Express protocol.

The MP 110 executes a control program of the controller 103 stored in the memory for MP 114, and realizes the above-described controller function. Further, the MP 110 operates as a Root Complex of the PCI Express.

The FE I/F 111 can be, for example, a Fibre Channel protocol chip, an iSCSI (Internet Small Computer System Interface) protocol chip, an Infiniband protocol chip, a Serial Rapid I/O protocol chip and the like, and executes various protocol processes.

The external memory for accelerator 131 is realized, for example, by a DDR (Double Data Rate) memory. An address conversion table 150 and management information are stored in the external memory for accelerator 131. The address conversion table 150 is a table for converting the LUN and the LBA designated by the host computer 102 to a device number of the SSD 115 and the address of the SSD in which the read data is stored. Further, the address conversion table 150 includes a flag information for determining whether the address of the read data is registered in the table or not.

A ROM 132 is a recording media for storing control programs operating in the accelerator 130, accelerator logical circuit data, and so on. When the accelerator is initialized, data is loaded from the ROM 132 to the accelerator 130.

The accelerator 130 is composed of a PCIe core 140, a Central Module 141, multiple Block RAMs 142, a memory controller 143, an internal queue 144, multiple CPUs (Central Processing Units) 145 and an internal memory 146. The accelerator 130 is realized by an ASIC (Application Specific Integrated Circuit) or an FPGA (Field Programmable Gate Array).

The PCIe core 140 is a function block realizing a physical layer and a data link layer of the PCI Express, and the interface with the Central Module 141 adopts a TLP (Transaction Layer Packet) format. Further, the PCIe core 140 operates as a PCI Express endpoint.

The Central Module 141 connects the respective modules within the accelerator 130, and controls the respective modules.

The Block RAMS 142 are internal memories for storing data, having SRAMs (Static Random Access Memories) and the like installed thereto.

The memory controller 143 is a module that accepts memory read/write access requests, controls the external memory for accelerator 131 or the internal memory 146 based on the access destination address information, and responds to the memory read/write access requests.

The internal queue 144 is a module storing the start parameter of the CPUs 145 and controlling the starting of the CPUs 145.

The CPUs 145 are modules for realizing FE I/F control and SSD control related to the I/O request processing. The control program is stored in the ROM 132, which is expanded into a program memory during initialization of the accelerator 130, and executed by the CPUs 145.

An inbound queue 151 for storing commands entered from the FE I/F 111, an outbound queue 152 for storing commands output to the FE I/F 111, a submission queue 153 for storing commands output to the SSDs 115, and a completion queue 154 for storing commands entered from the SSDs 115 are stored in the internal memory 146. That is, when processing an I/O request from the host computer 102, the internal memory 146 serves to store the control information related to the relevant I/O request.

The aforementioned queues include a head pointer pointing to the head of a queue entry, and a tail pointer pointing to a tail thereof. Enqueue (adding an entry to a queue) is realized by entering a new entry to a location designated by the tail pointer, and incrementing the tail pointer. Dequeue (extracting an entry from a queue) is realized by extracting the entry of a location designated by the head pointer, and incrementing the head pointer.

All or a portion of the various queues described above can be stored in the external memory for accelerator 131, which is an external memory of the accelerator 130. Further, a portion or all of the address conversion table 150 within the external memory for accelerator 131 can be stored in the internal memory 146. In the following description, unless otherwise stated, the external memory for accelerator 131 and the internal memory 146 are both referred to as "accelerator memory".

The installation of the queues is not restricted to the method described above, and the queues can also be installed as hardware using a FIFO (First In First Out) memory and the like. Further, the queues can also be installed individually to multiple CPUs 145, and in that case, there is no need to perform exclusive control of queues among CPUs.

A battery and an overall management processor not illustrated are installed in the controllers 103. The battery protects the data in the memory for MP 114, which is a volatile memory, when power failure occurs to the controllers 103. The overall management processor is a management processor of the controllers 103, which provides settings of the logical volumes and settings of various functions, and provides maintenance management functions and the like.

Figure 2A:
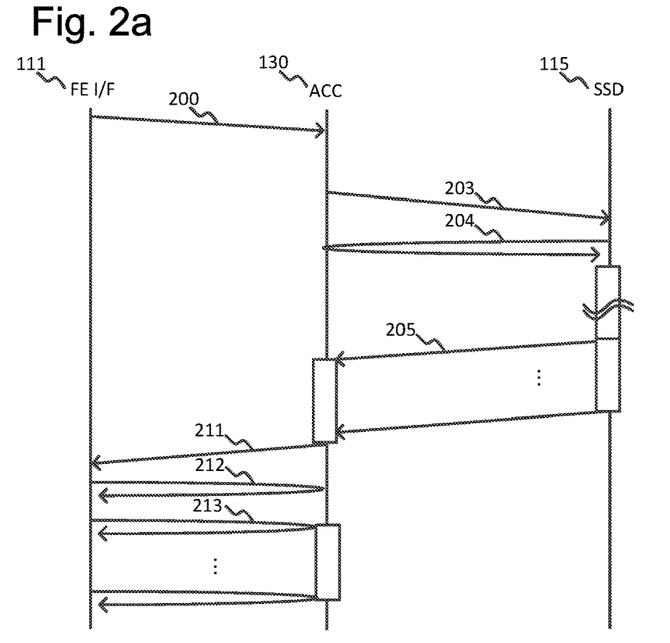
FIG. 2a is a view showing a processing sequence of a controller with respect to a read I/O request according to Embodiment 1 of the invention.
Figure 2B:
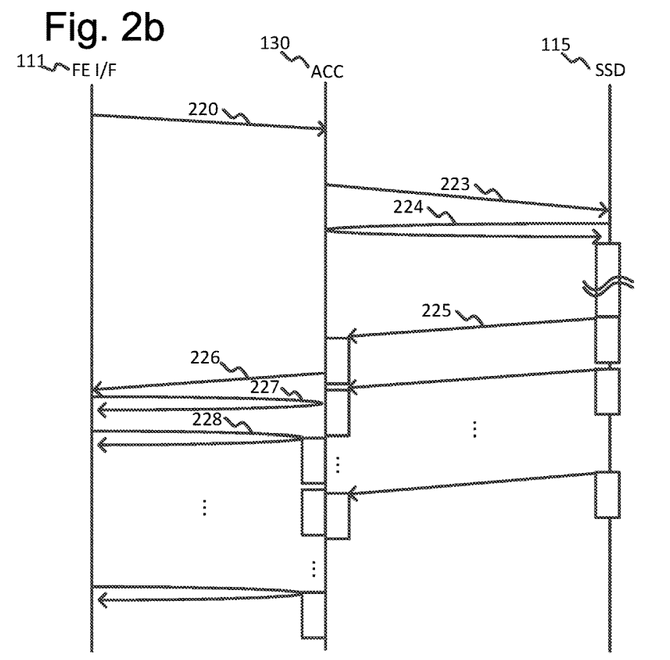
FIG. 2b is a view showing a processing sequence of a controller when the read I/O request has a large I/O length according to Embodiment 1 of the invention.

FIG. 2 is a view illustrating a processing sequence of the controller 103 with respect to a read I/O request according to Embodiment 1.

Prior to the read I/O request, the host computer 102 executes an initialization process, such as login, to the controller 103. Thereafter, we will assume that the host computer 102 has transmitted to the controller 103 a read I/O request having a 4-K-byte length regarding a certain LBA in a certain logical volume. Hereafter, the process performed in the controller 103 according to this case will be described with reference to the process sequence illustrated in FIG. 2*a*.

The FE I/F 111 enqueues the received read I/O request command to the inbound queue 151 of the accelerator memory (200). The accelerator 130 creates a DMA (Direct Memory Access) script based on the contents of the command, and enqueues the same to the submission queue 153 within the accelerator memory.

The accelerator 130 issues an interrupt (such as an MSI-X (Message Signaled Interrupts-eXtended)) to the SSDs 115, and notifies the same (203).

The SSD 115 dequeues from the submission queue 153 (204). Thereafter, the SSD 115 reads data from the flash memory chip based on the DMA script acquired from the dequeue, and when the data is prepared, transfers the data to the accelerator 130 (205). When data transfer is completed, the SSD 115 enqueues the entry showing data transfer complete to the completion queue 154.

The accelerator 130 stores the transferred data in the Block RAM 142. Next, when the accelerator 130 dequeues from the completion queue 154 and detects data transfer complete, it creates a DMA script of the FE I/F 111, and enqueues to the outbound queue 152. Then, the accelerator 130 issues an interrupt to the FE I/F 111, and notifies the same (211).

The FE I/F 111 dequeues from the outbound queue 152 (212). Thereafter, the FE I/F 111 reads data from the accelerator 130 based on the DMA script acquired from the dequeue (213). Lastly, the FE I/F 111 transmits a read response together with the read data to the host computer 102.

The above description has illustrated a series of the processing sequence performed by the controller 103 with respect to a read I/O request.

Next, the process performed in the controller 103 when the read I/O request received from the host computer 102 has a large I/O length (such as few M bytes or greater) will be described with reference to the processing sequence illustrated in FIG. 2*b*.

The FE I/F 111 enqueues the received read I/O request command to the inbound queue 151 of the accelerator memory (220). When the accelerator 130 determines that the I/O length is large based on the contents of the command, it creates multiple DMA scripts by dividing the data into transfer lengths no greater than the capacity of the Block RAMs 142, and enqueues the same to the submission queue 153 within the accelerator memory.

The accelerator 130 issues an interrupt (such as an MSI-X) to the SSD 115 and notifies the same (223).

The SSD 115 dequeues from the submission queue 153 (224). Thereafter, the SSD 115 reads data from the flash memory chip based on the DMA script acquired by the dequeue, and when the data is prepared, it transfers the data to the accelerator 130 (225). The SSD 115 repeats performing the dequeue and data transfer in a similar manner to multiple DMA scripts. When transfer is completed, the SSD 115 enqueues to the completion queue 154.

The accelerator 130 stores the transferred data in the Block RAM 142. Next, when the accelerator 130 dequeues from the completion queue 154 and detects completion of data transfer, it creates a DMA script of the FE I/F 111, and enqueues to the outbound queue 152. Then, the accelerator 130 issues an interrupt to the FE I/F 111, and notifies the same (226).

The FE I/F 111 dequeues from the outbound queue 152 (227).

Thereafter, the FE I/F 111 reads the data from the accelerator 130 based on the DMA script acquired from the dequeue (228). The accelerator 130 repeatedly performs storage of data in the Block RAM 142 and transfer of data to the FE I/F 111 in a similar manner to multiple data transfers from the SSD 115. Lastly, the FE I/F 111 transmits a read response together with the read data to the host computer 102.

The above has described a series of processing sequences to the controller 103 with respect to a read I/O request when the I/O length is great.

Generally, in ASICs and FPGAs, a large memory area cannot be installed as the internal memory, and the internal memory capacity installed in the accelerator is no greater than a few M bytes. Therefore, if the I/O length is greater than a few M bytes, a problem occurs where not all the data can be stored in the Block RAM. Therefore, when the I/O length is great, the accelerator divides the data into sizes that can be stored in the Block RAM, and transfers the divided data. This configuration exerts an effect of enabling data to be transferred using small-capacity memories, regardless of the I/O length. Further, if all data having a large size is temporarily stored in the memory and transferred thereafter, a drawback occurs where the response time becomes elongated in proportion to the I/O length when seen from the host computer. According to the present invention, the data is divided within the controller and transferred, so that the divided data can be sequentially sent as response to the host computer in the prepared order, thereby exerting an effect of cutting down the response time.

Figure 3:
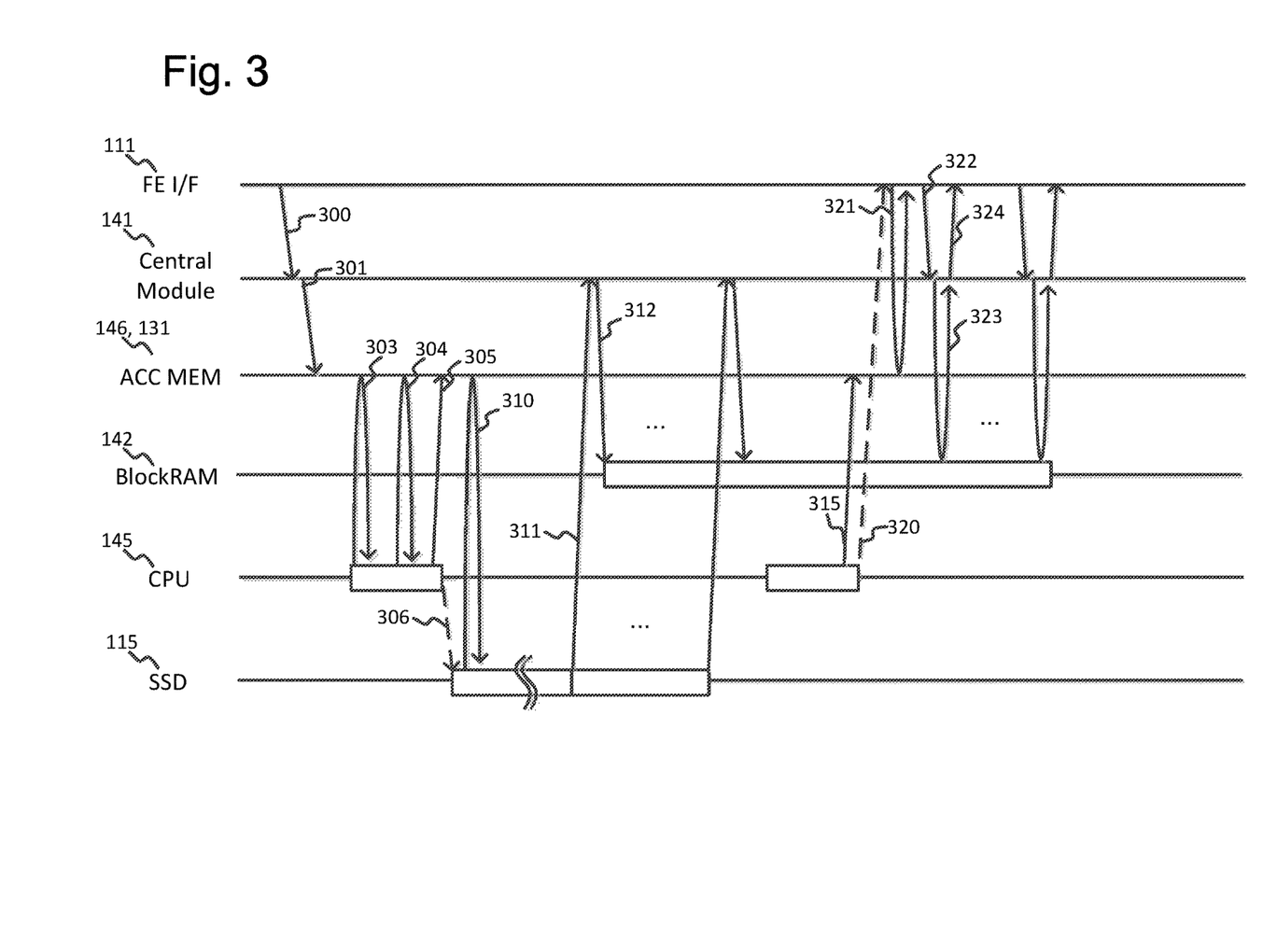
FIG. 3 is a timing chart of an accelerator according to Embodiment 1.

FIG. 3 is a view showing a detailed timing chart of the respective modules in the accelerator 130 regarding the process sequences with respect to the read I/O request illustrated in FIG. 2.

Similar to FIG. 2, at first, the host computer 102 performs an initialization process such as login to the controller 103. Next, we will assume that the host computer 102 transmits a 4 KB-length read I/O request to a certain LBA of a certain logical volume.

The FE I/F 111 notifies the received read I/O request to the accelerator 130 (300). Specifically, the notification of the read I/O request is realized by writing the PCIe packet including the FC (Fibre Channel) packet information in a payload to the accelerator 130. In the accelerator 130, the PCIe packet is received via the PCIe core 140 by the Central Module 141.

The Central Module 141 extracts a destination address from the header of the PCIe packet, and when the destination address is an address designating an accelerator memory area, it writes the payload data of the PCIe packet to the accelerator memory (the internal memory 146 or the external memory for accelerator 131) (301).

Next, the FE I/F 111 notifies the completion of enqueue to the accelerator 130 by updating the tail pointer of the inbound queue 151.

Thereafter, the CPU 145 detects update of the tail pointer, and acquires the queue entry designated by the head pointer (303). Then, the CPU 145 analyzes the acquired queue entry and extracts the LUN and the LBA.

Next, the CPU 145 refers to the address conversion table 150 (304), and converts the LUN and the LBA to an SSD device number and an LBA address of the SSD.

Thereafter, the CPU 145 enqueues the DMA script to the submission queue 153 corresponding to the SSD device number (305). The LBA address of the SSD is set as the transfer source address, and entry ID information identifying the entry and address information designating the data storage area are set as the transfer destination address in the DMA script.

Next, the CPU 145 notifies update of the tail pointer of the submission queue 153 by interrupt or the like to the SSD 115 (306).

When the SSD 115 detects update of the tail pointer, it acquires a queue entry from the submission queue 153 (310). Thereafter, the SSD 115 executes data readout from the internal flash memory chip based on the transfer source address.

Next, when reading of data from the flash memory chip is completed, the SSD 115 writes the data to the transfer destination address (311).

When the Central Module 141 receives a PCIe packet including the data from the SSD 115, it extracts the destination address from the header of the PCIe packet. Then, when the destination address designates a data storage area, the Central Module 141 refers to a free state management resister (not shown, the internal resister of the Central Module 141) of the Block RAM 142, and allocates the block RAM 142 in a free state so that the data is written to the Block RAM 142 in the free state (312). Further, when writing of all the data to the Block RAMs 142 is completed, the Central Module 141 enqueues the entry ID information included in the destination address and the Block RAM ID information identifying the Block RAM 142 to which data has been written to the internal queue 144.

Next, the CPU 145 detects the enqueue to the internal queue 144, and reads the entry ID information and the Block RAM ID information. Next, the CPU 145 refers to the entry of the inbound queue 151 designated by the entry ID information, and creates an entry of the outbound queue 152 (315). As an entry of the outbound queue 152, an address of the accelerator 130 including a Block RAM ID in a portion thereof is set as the transfer source address of data.

Next, the CPU 145 notifies update of tail pointer of the outbound queue 152 by interrupt and the like to the FE I/F 111 (320).

When update of the tail pointer is detected, the FE I/F 111 acquires a queue entry from the outbound queue 152 (321).

Next, based on the queue entry information, the FE I/F 111 transmits a data read request to the Central Module 141 (322).

The Central Module 141 receives the PCIe packet of the data read request. The Central Module 141 extracts the destination address from the header of the PCIe packet, refers to the Block RAM ID information included in the destination address, reads the data from the Block RAM 142 (323), and transmits the same to the FE I/F 111 (324).

When transmission of all data is completed, the Central Module 141 changes the free state management resister corresponding to the Block RAM 142 to a value showing the free state, and frees the Block RAM 142.

Lastly, when reading of all data is completed, the FE I/F 111 transmits the data to the host computer 102.

In the above description, a case has been illustrated where one I/O request is processed, as an example, but the I/O processing is actually performed in a multiplexed manner where multiple SSDs, multiple CPUs and multiple Block RAMs operate in parallel.

In the present invention, by installing a large number of Block RAMs 142 in parallel within the accelerator 130, it becomes possible to expand the memory bandwidth in proportion to the number of installed Block RAMs.

A method for detecting the enqueue by monitoring update of the tail pointer via polling has been adopted in the CPUs 145. It is also possible to adopt a method where the Central Module 141 or the internal queue 144 detects enqueue and starts the CPUs 145 via interrupt and the like.

Further, the Central Module 141 has an address range information for discriminating whether the destination address extracted from the header of the PCIE packet is a data area (Block RAM area) or a management data area such as the queue or the address conversion table (the external memory for accelerator 131 or the internal memory 146).

Figure 4:
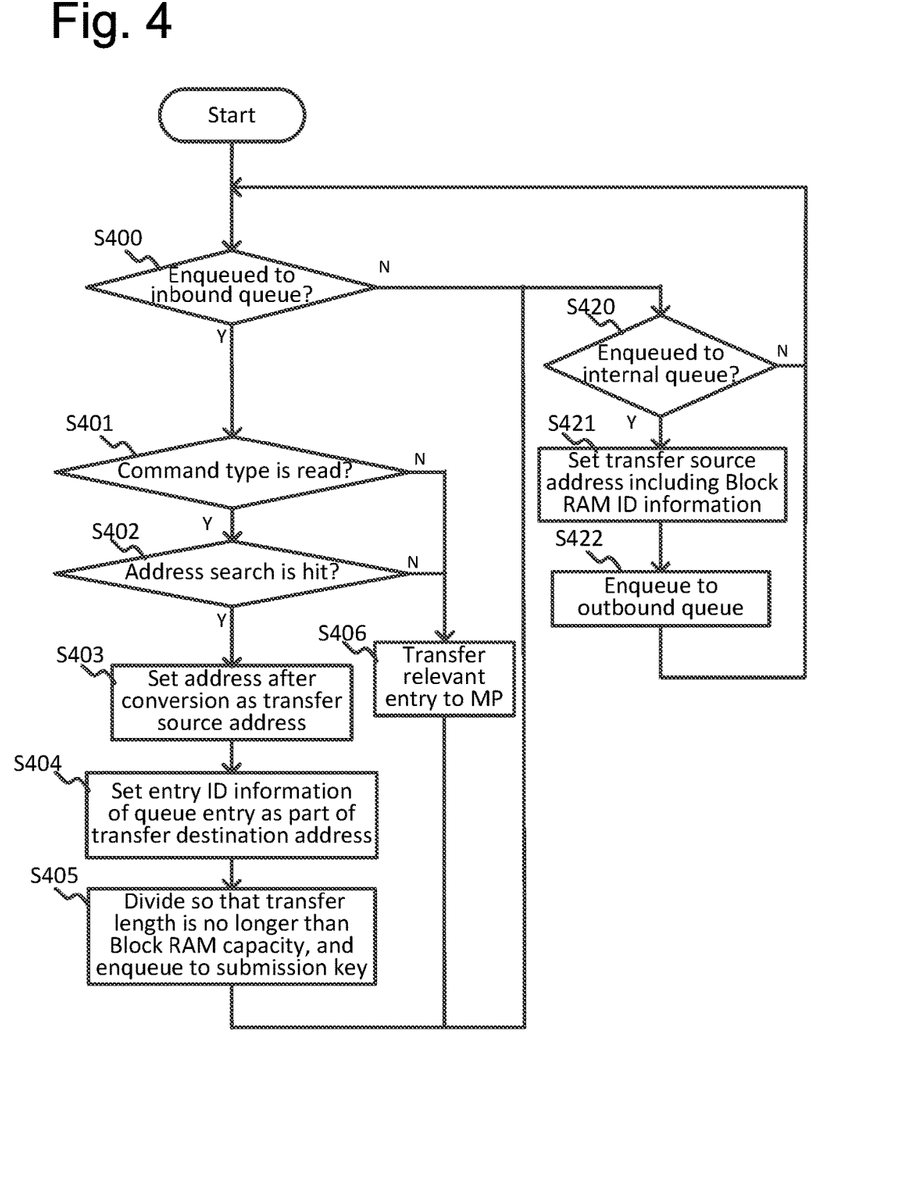
FIG. 4 is a flowchart illustrating a processing flow of a CPU according to Embodiment 1.

FIG. 4 is a flowchart illustrating a process flow of the CPU 145 according to Embodiment 1 of the present invention. The flowchart illustrated here corresponds to a process sequence executed by the CPU 145 out of the process sequences illustrated in FIG. 3 (excluding processes related to interrupt and the like).

The CPU 145 checks whether or not enqueueing has been performed to the inbound queue 151 in step S400.

If the above-mentioned enqueueing has not been performed (N), the CPU 145 executes the process of step S420 described below.

If the above-mentioned enqueueing has been performed (Y), the CPU 145 refers to a command type information of the enqueued entry in step S401, and checks whether the command type is a read or not. Steps S400 and S401 described above correspond to 303 of FIG. 3.

If the command type is other than read (N) (such as when the command type is a write command, or a control command such as login), the CPU 145 transfers the relevant entry to the MP 110 in step S406.

If the command type is read (Y), the CPU 145 refers to the LUN and the LBA of the relevant entry in step S402, and searches the address conversion table 150 using the LUN and the LBA.

If the search result is no hit (N), the CPU 145 executes the process of step S406 (transfers the relevant entry to MP 110).

If the search result is hit (Y), in step S403, the CPU 145 sets the address after conversion as the transfer source address of the DMA script. The above-described steps S402 and S403 correspond to 304 of FIG. 3.

Next, in step S404, the CPU 145 sets the entry ID information for identifying the entry as a portion of the aforementioned DMA script.

Thereafter, in step S405, the CPU 145 enqueues the DMA script to the submission queue 153. In this step, if the I/O length is great, the CPU 145 sets the transfer length to be no greater than the capacity of the Block RAM 142, and enqueues the divided I/O lengths in multiple times to the submission queue 153. The above-described steps S404 and S405 correspond to 305 of FIG. 3.

In step S420, the CPU 145 checks whether enqueueing has been performed to the internal queue 144 or not.

If the enqueueing has not been performed to the internal queue (N), the CPU 145 returns to the initial process (step S400).

If enqueueing has been performed to the internal queue (Y), in step S421, the CPU 145 sets an address including a Block RAM ID information in a portion thereof as the transfer source address of the DMA script.

Next, in step S422, the CPU 145 enqueues the DMA script to the outbound queue 153. The aforementioned steps S420 through S422 relate to 315 of FIG. 3.

Thereafter, the CPU 145 returns to the initial process (step S400).

According to one example of the method for searching the address conversion table 150, the address conversion table 150 is searched by using the LUN and the LBA as the key to determine whether the flag information indicates hit. If the result is hit, the search is realized by reading the SSD number and the SSD address. As another example of the method for searching the address conversion table 150, the hash value of the LUN and the LBA is computed, and the address conversion table 150 is searched based on the relevant hash value. In that case, multiple entries of the list structure are stored in the address conversion table 150, and the list is searched sequentially in order.

The management of the address conversion table 150 (registering and deleting of entry and the like) is executed by the MP 110.

Further, the process related to the inbound queue (400, 401, 402, 403, 404, 405, 406) and the process related to the internal queue (420, 421, 422) can be realized by different CPUs.

The MP 110 has a queue for MP (not shown) in the memory for MP 114. When the accelerator 130 transfers an entry to the MP (aforementioned step S406), specifically, the entry is enqueued to the inbound queue for MP. The outbound queue for MP is enqueued by the MP 110 and dequeued by the accelerator 130. Next, the accelerator 130 merges the outbound queue 152.

Figure 5:
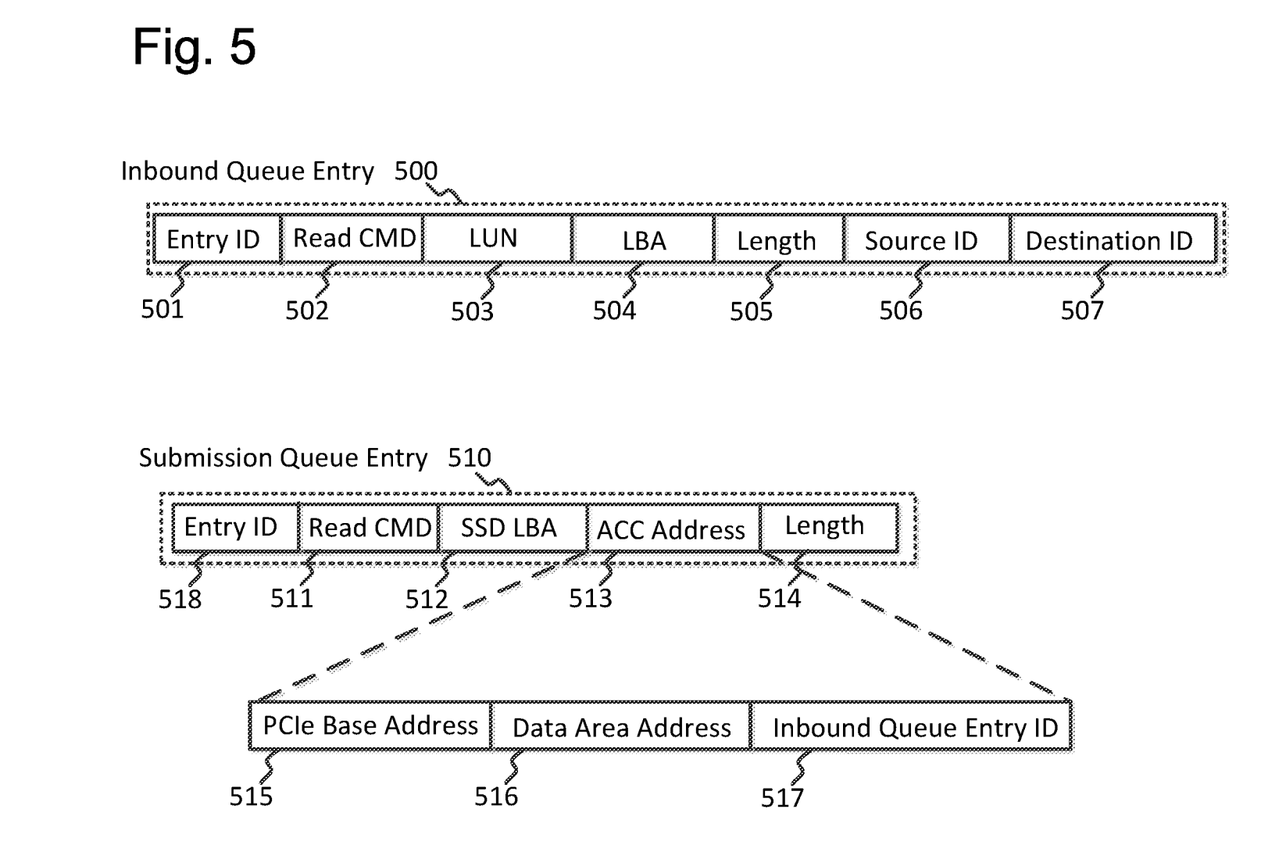
FIG. 5 is an example of an entry format of an inbound queue and a submission queue according to Embodiment 1.

FIG. 5 illustrates format examples of the respective entries of the inbound queue 151 and the submission queue 153 according to Embodiment 1 of the present invention.

An inbound queue entry 500 is composed of, in the named order, an entry ID 501, a command type 502, a LUN 503, an LBA 504, a length 505, a source ID 506 and a destination ID 507.

ID information identifying entries are stored in the entry ID 501. Command types (such as a read command, a write command, a control command and so on) are set in the command type 502 (in the following description, we will assume that the command is a read command). The LUN 503 is information for identifying the logical volume. The LBA 504 is an address information of a logical volume. The length 505 shows the I/O length of the read request. The source ID 506 is information for identifying the initiator for issuing the read command request. The destination ID 507 is information for identifying the target processing the read command request. Here, the source ID 506 and the destination ID 507 are information determined when initializing the login process.

Next, a submission queue entry 510 is composed of an entry ID 518, a command type 511, an SSD LBA 512, an accelerator address 513 and a length 514. An ID information for identifying an entry is set in the entry ID 518. Command types are set in the command type 511. The LBA information within the transfer source SSD of the read data is set in the SSD LBA 512. A transfer destination address of the read data is shown in the accelerator address 513. An I/O length of the read request is shown in the length 514 shows.

The accelerator address 513 is composed of a PCIe base address 515, a data area address 516 and an inbound queue entry ID 517. The PCIe base address 515 is an address that the accelerator 130 allocates during initialization as the PCIe endpoint. The data area address 516 is information showing the data area within the accelerator 130, and the data to which the relevant address is set is stored in the Block RAM 142. The inbound queue entry ID 517 is information for identifying the entry of the inbound queue 152.

Figure 6:
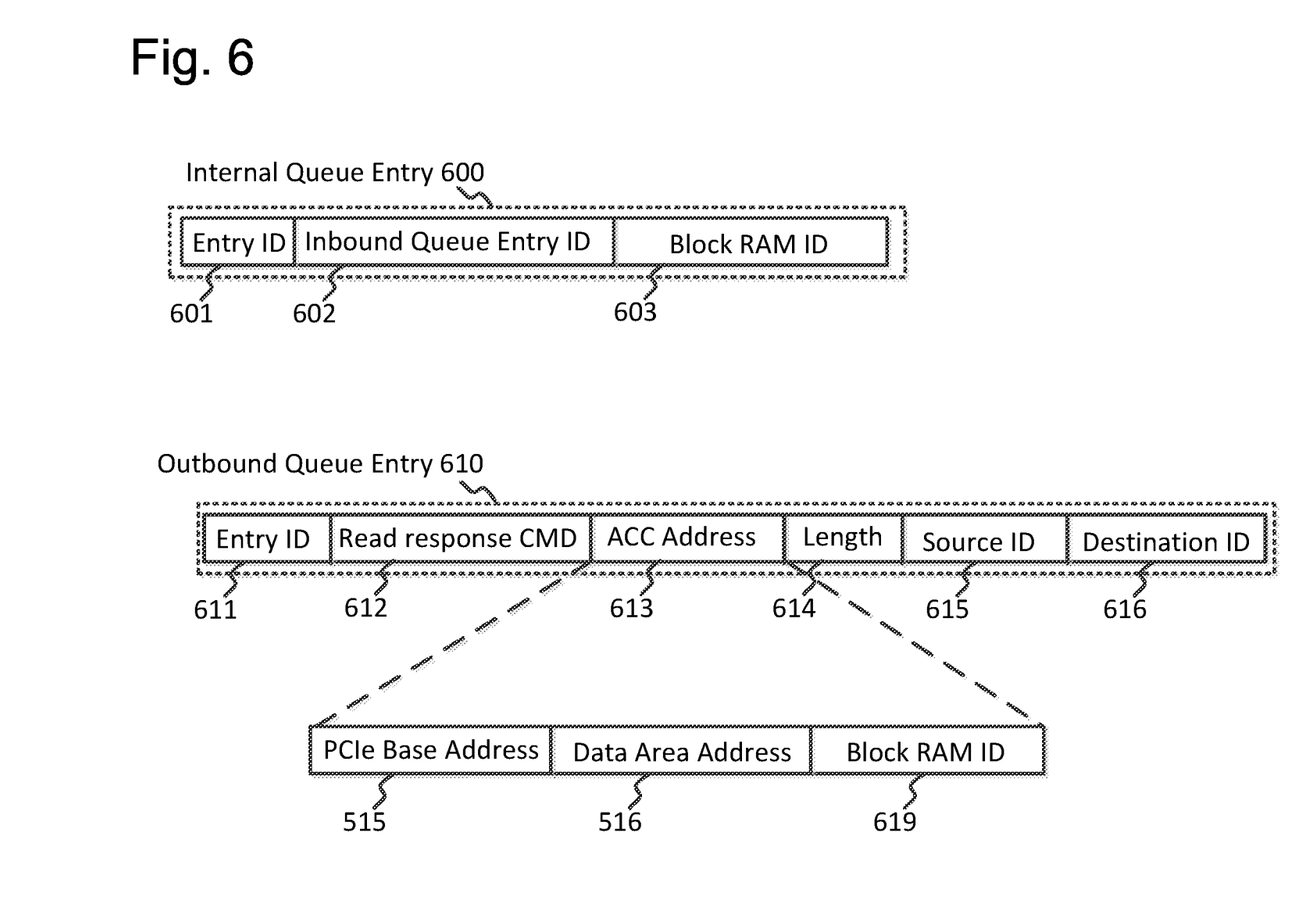
FIG. 6 is an example of an entry format of an internal queue and an outbound queue according to Embodiment 1.

FIG. 6 is a view illustrating a format example of an entry of the internal queue 146 and the outbound queue 152 according to Embodiment 1 of the present invention.

The internal queue entry 600 is composed of an entry ID 601, an inbound queue entry ID 60 and a Block RAM ID 603. The entry ID 601 is an ID information for identifying the entry. The inbound queue entry ID 602 is information for identifying the inbound queue entry. The Block RAM ID 603 is information for identifying the multiple Block RAMs 142.

The outbound queue entry 610 is composed of an entry ID 611, a command type 612, an accelerator address 613, a length 614, a source ID 615 and a destination ID 616. The entry ID 611 is ID information for identifying the entry. Command types (a read response in the present example) are set in the command type 612. The accelerator address 613 shows the transfer source address of the read data. The length 614 shows the transfer length. The source ID 615 is information for identifying the target to which the read data is to be returned. The destination ID 507 is information for identifying the initiator for receiving the read data.

Further, the accelerator address 613 is composed of the PCIe base address 515, the data area address 516 and a Block RAM ID 619. The PCIe base address 515 and the data area address 516 are as explained in the description of the accelerator address 513 of the submission queue entry 510. Further, the Block RAM ID 619 is information for identifying the multiple Block RAMs 142.

As described, according to the present invention, by dynamically allocating the Block RAMs 142 at the required timing of data arrival, the memory allocation time can be retained to a minimum. Thereby, the present invention has an effect of eliminating the need for an external memory, and to realize data transfer using a small-capacity internal memory such as an ASIC or a FPGA.

For example, if the time required from the instruction for starting data read to the completion of data read from the flash memory chip in an SSD is 200 µs in average, the present invention enables to cut down the memory allocation time by 200 µs (actually, the aforementioned CPU processing time is added to this time). The time corresponding to 200 µs corresponds to a memory area of 300 KB per 1 I/O processing, when assuming that the data readout bandwidth of the SSD is 1.5 GB/s. When the multiplicity of the I/O processing is assumed to be 1000, the present invention has an effect of reducing a total of 300 MB of the required memory area. Further, in the case of an HDD, an even greater effect can be expected since the seek time required for reading data may be more than ten ms.

Since the Block RAM 142 is allocated dynamically, the write destination address of data when seen from the SSD side is a so-called virtual address. Therefore, in general, it is necessary to convert the virtual address within the accelerator 130 to an address corresponding to the physical memory area.

In Embodiment 1, at the point of time when allocation of the Block RAM 142 is completed, the conversion cost from the afore-mentioned virtual address to the physical memory area address is reduced by converting the storage destination address of data seen from the FE I/F 111 side to the address corresponding to the physical memory area (Block RAM ID). Thereby, it becomes possible to return a response to the data read request from the FE I/F 111 more speedily via a hardware module (Central Module 141) without having the CPU 145 intervened to refer to the management information such as the queue entry.

There are two types of input/output data handled by the accelerator 130, which are the host data stored in the SSD and the control data (such as the queue or the address conversion table). The host data basically has a large size, and the memory input and output performed per I/O request is once, respectively. On the other hand, as for the control data, input and output per I/O request is performed for a few tens of times in small sizes, such as in units of 4 B. In other words, regarding data having a large size and small access frequency, such as the host data, memory resource is saved by performing a dynamic memory allocation control. On the other hand, as for data having a small size and a large number of accesses, such as the control data, dynamic memory allocation control, which requires high costs, is not performed. As described, the present invention characterizes in switching the memory control method according to the characteristics of data.

<Embodiment 2>

Figure 7:
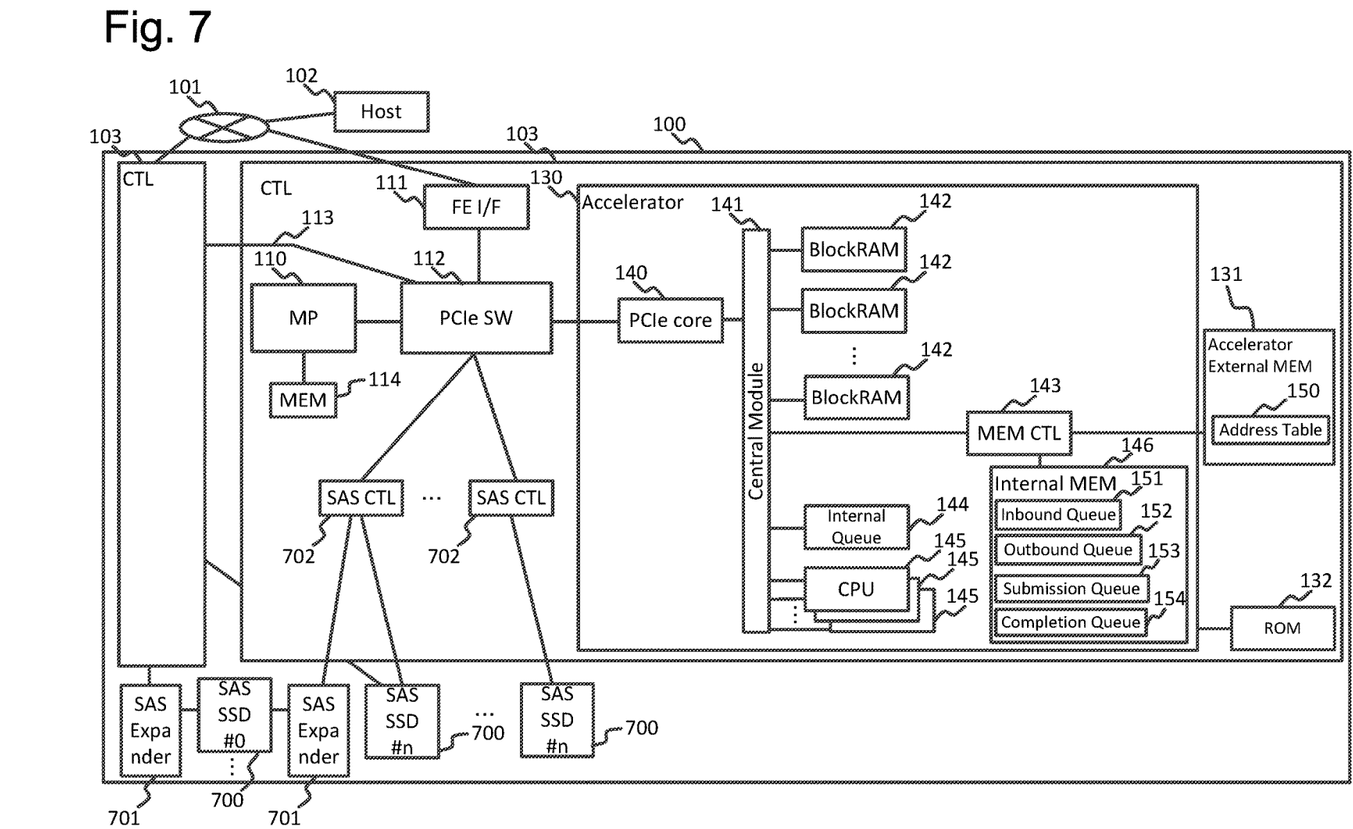
FIG. 7 is a configuration diagram of a computer system according to Embodiment 2.

FIG. 7 illustrates a configuration diagram of a computer system according to Embodiment 2, which is a second preferred embodiment of the present invention.

In the computer system of FIG. 7, the components having the same reference numbers as FIG. 1 described earlier have the same functions as the configuration of FIG. 1, so that the description thereof is omitted. The difference with Embodiment 1 is that a connection protocol of the SSD is changed to SAS (Serial Attached SCSI), and that multiple SAS controllers 702, multiple SAS SSDs 700 and multiple SAS expanders 701 are added to the configuration. Multiple SAS controllers 702 are provided within each controller 103, and each SAS controller is connected to a SAS SSD 700 and a SAS expander 701.

Embodiment 2 aims at realizing capacity expansion using the SAS protocol and the SAS expander. The SAS corresponds to a host swap, and enables to enhance maintenance performances, such as replacement or adding of SSDs while the storage is in operation.

The SAS controller 702 is a controller module for converting the SAS protocol and the PCIe protocol, and controlling the SAS SSD 700 and the SAS expander 701. The interface of the SAS controller 702 is a basic queue interface, similar to the SSDs 115 of the Embodiment 1. The SAS expander 701 is a switch module connecting multiple SSDs, and enables expansion of the number of SSDs connected thereto. Further, the SAS expander 701 is capable of connecting in a cascade, and based on the SAS Standard, a maximum of 16384 SAS SSDs can be connected through expansion.

<Embodiment 3>

Figure 8:
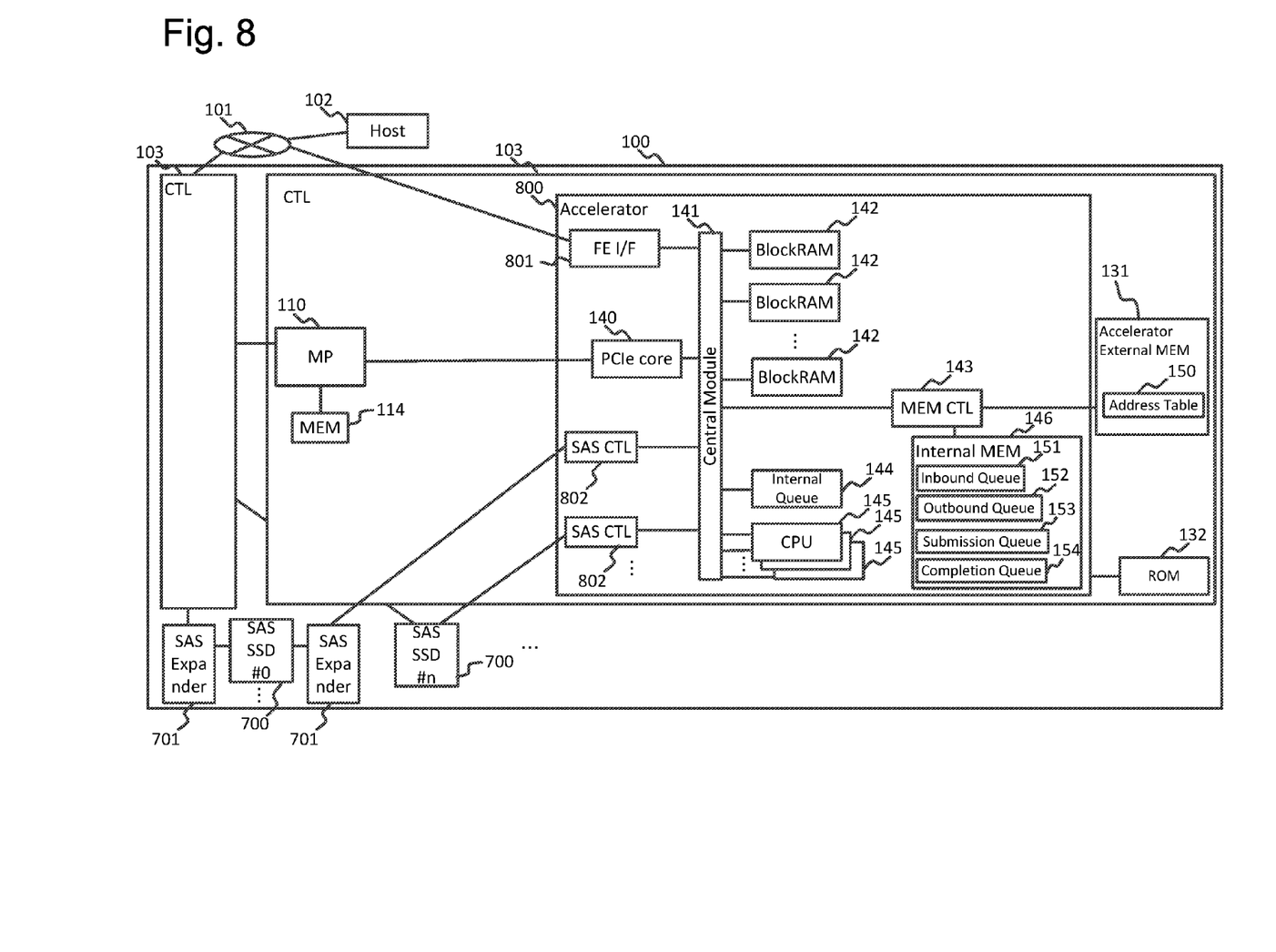
FIG. 8 is a configuration diagram of a computer system according to Embodiment 3.

FIG. 8 is configuration diagram of a computer system according to Embodiment 3 of a third preferred embodiment of the present invention.

In the computer system of FIG. 8, the components denoted by the same reference numbers as FIGS. 1 and 7 described earlier have the same functions, so that the descriptions thereof are omitted. The difference from Embodiment 2 is that the FE I/F 111 and the SAS controller 702 are formed as an SoC (System On Chip) within an accelerator.

The accelerator 800 is composed of an FE I/F 801, multiple SAS controllers 802, a PCIe core 140, a Central Module 141, multiple Block RAMs 142, a memory controller 143, an internal queue 144, multiple CPUs 145, and an internal memory 146. The FE I/F 801 is a module connected to the Central Module 141, and realizes a fibre channel protocol processing, for example. The SAS controllers 802 are controller modules connected to the Central Module 141, and controls the SAS SSD 700 and the SAS expander 701.

According to Embodiment 3 where the accelerator 800 is formed as an SoC, effects such as the reduction of the number of components and the reduction of latency of data path can be realized.

The present invention is not restricted to Embodiments 1 through 3 described above, and can include various modifications. For example, Embodiments 1 through 3 are illustrated in detail to merely facilitate understanding of the present invention, and the invention is not restricted to a structure having all the components illustrated above.

REFERENCE SIGNS LIST

100: Storage System
101: Network
102: Host Computer
103: Controller
110: Microprocessor (MP)
111, 801: Frontend Interface (FE I/F)
113: Connection Line
115, 700: Solid State Drive (SSD)
130, 800: Accelerator
131: External Memory for Accelerator
132: ROM
140: PCIe Core
141: Central Module
142: Block RAM
143: Memory Controller
144: Internal Queue
145: CPU
146: Internal Memory
150: Address Conversion Table
151: Inbound Queue
152: Outbound Queue
153: Submission Queue
154: Completion Queue
701: SAS expander
702, 802: SAS controller

The invention claimed is:

1. A storage system comprising:
one or more storage drives; and
one or more controllers for receiving processing requests from a superior device;
wherein each of said one or more controllers has a processor for executing the processing requests, and an accelerator; and
wherein the accelerator has multiple internal data memories and an internal control memory,
wherein, when the accelerator receives a read Input/Output (I/O) request, the accelerator is configured to:
store a control information regarding the request in the internal control memory,
read data being the target of the read I/O request from at least one storage drive out of the multiple storage drives,
dynamically allocate one or more of said internal data memories at a timing when receiving the data being the target of the read I/O request which is read from at least one storage drive out of the one or more storage drives,
temporarily store the received data in the one or more said internal data memories, and sequentially transfer the stored data in order from the one or more said internal data memories to the superior device.

2. The storage system according to claim 1, wherein the accelerator is further configured to:

when dynamically allocating the one or more said internal data memories, the associate an identifier of the read I/O request to an identifier of the allocated one or more said internal data memories, and record the same in the internal control memory.

3. The storage system according to claim 2, wherein the controller is further configured to:

instruct the accelerator to transfer the data from the one or more said internal data memories to the superior device using the identifier of the allocated one or more said internal data memories.

4. The storage system according to claim 1, wherein the accelerator is further configured to:

when the read I/O request has an I/O length equal to or greater than a predetermined size, divide the data being the target of the I/O read request into transfer queues not greater than a capacity of one of said internal data memories, and read the data from at least one storage drive out of said one or more storage drives.

5. The storage system according to claim 1, wherein the accelerator is composed of an Application Specific Integrated Circuit (ASIC) or a Field Programmable Gate Array (FPGA).

6. The storage system according to claim 5, wherein each of said one or more controllers has an external memory for the accelerator at an outer side of the accelerator; and the accelerator is further configured to:

store control information related to the read I/O request in at least either the internal control memories or the external memory.

* * * * *